United States Patent [19]

Matthias

[11] Patent Number: 5,344,361
[45] Date of Patent: Sep. 6, 1994

[54] SUN ROOF VENT

[76] Inventor: Jan H. Matthias, 1509 N. Beverly Dr., Beverly Hills, Calif. 90210

[21] Appl. No.: 892,590

[22] Filed: Jun. 3, 1992

[51] Int. Cl.⁵ .......................... B60J 7/11; B60H 1/26
[52] U.S. Cl. .................................. 454/129; 454/136; 454/162; 454/900
[58] Field of Search ............... 454/128, 129, 131, 136, 454/137, 162, 900

[56] References Cited

U.S. PATENT DOCUMENTS

| | | | |
|---|---|---|---|
| 2,628,549 | 2/1953 | Stelmach | 454/128 |
| 4,798,410 | 1/1989 | Weller . | |
| 4,800,803 | 1/1989 | Farmont | 454/129 |
| 4,895,065 | 1/1990 | Lamparter | 454/136 |
| 4,911,257 | 3/1990 | Kajimoto et al. . | |
| 5,003,866 | 4/1991 | Ricci | 454/136 X |
| 5,038,674 | 8/1991 | Merges . | |
| 5,040,455 | 8/1991 | Doi et al. . | |
| 5,081,912 | 1/1992 | Cleney | 454/136 |

FOREIGN PATENT DOCUMENTS

| | | | |
|---|---|---|---|
| 3937642 | 6/1990 | Fed. Rep. of Germany | 454/129 |
| 223511 | 12/1984 | Japan | 454/162 |
| 132407 | 6/1986 | Japan | 454/136 |

Primary Examiner—Harold Joyce
Attorney, Agent, or Firm—Blakely, Sokoloff, Taylor & Zafman

[57] ABSTRACT

A portable auxiliary fan unit that can be installed into the sunroof of an automobile and exhaust the air from the passenger compartment of the vehicle. The fan unit includes a panel assembly which has a passage that provides fluid communication between the passenger compartment and the outside of the car. Within the passage is a fan which can induce air flow from the interior of the vehicle to the ambient. The fan is powered by a plurality of solar cells located beneath a transparent top panel member. The fan unit is installed into an opening of the roof that is created by fully retracting the sliding roof panel of the car. The unit has a pair of levers at opposite edges of the transparent panel. The levers are inserted into grooves that normally guide the sliding roof panel, to secure the panel and fan to the roof of the car. Once installed, the solar cells power the fan, which causes air to flow from the passenger compartment to the outside of the car.

3 Claims, 4 Drawing Sheets

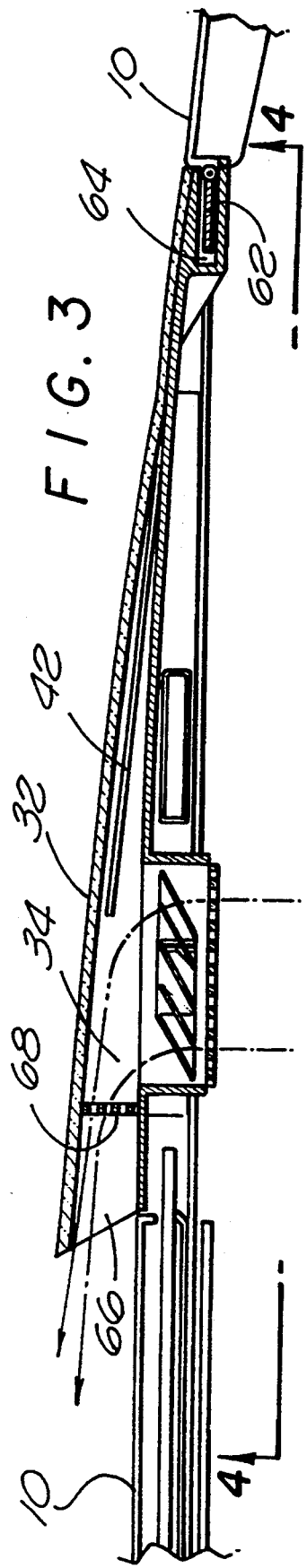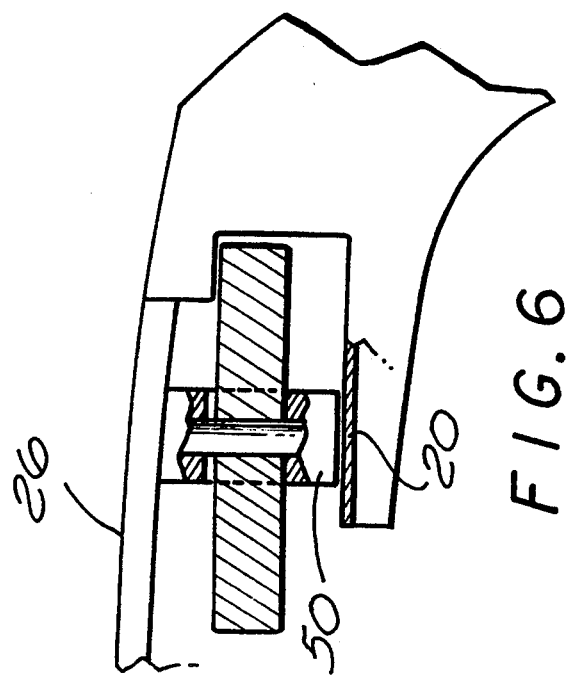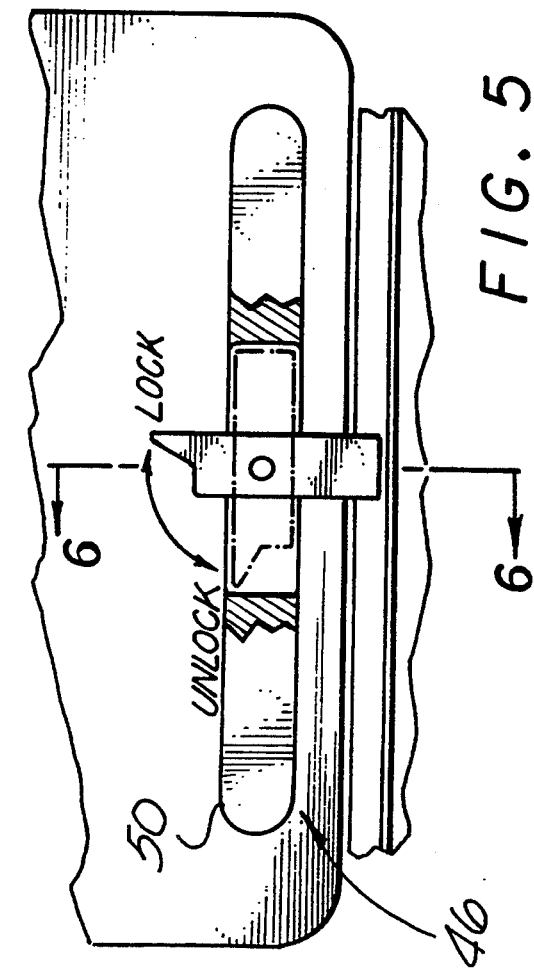

SUN ROOF VENT

BACKGROUND OF THE INVENTION

1. Field of the Invention

The present invention relates to a portable auxiliary fan unit that can be installed into the sunroof opening of an automobile.

2. Description of Related Art

The windows of an automobile are typically rolled up when the car is parked and unattended, to protect the vehicle from thieves and the environment. If the automobile is exposed to heat and light, the interior of the vehicle can become hot and stuffy. The passenger compartment may reach a temperature which causes permanent damage to the interior of the car. Additionally, food or other objects left in the car may become melted or spoiled. It is therefore desirable to provide the car with a fan unit that can circulate air through the passenger compartment when the vehicle is not running. To preserve the car battery, it is desirable to power the fan with an auxiliary source of power.

U.S. Pat. No. 5,038,674 issued to Merges discloses an auxiliary fan unit located in the roof of an automobile. The Merges device has a fan connected to a panel that can be pushed into an open position to provide an opening in the roof of the car. When the panel is open, the fan blows air into the passenger compartment. The fan is connected to a solar panel which provides power to the fan motor. Although the Merges fan unit can circulate air through the passenger compartment, rain and other foreign debris can fall into the car when the panel is in the open position.

U.S. Pat. No. 4,800,803 issued to Farmont discloses a sunroof that has an auxiliary fan. The fan is powered by photo voltaic cells mounted onto a fan frame. The cells and fan are covered by a transparent panel which can be pushed into an open position, to allow the fan to circulate air through passenger compartment of the car. The Farmont device is built into the roof and requires a modification of the car. The integration of the fan into the roof of the car also produces a permanent obstruction in the sunroof.

U.S. Pat. No. 5,003,866 issued to Ricci discloses a portable fan unit which can be installed into the sunroof of a car. The Ricci device has solar cells that provide auxiliary power to the fan. The solar cells are mounted to a transparent panel that is attached to the sliding roof panel of the car. The fan is located in a compartment which extends well above the roof line. The fan compartment creates a surface that generates undesirable drag on the vehicle. Additionally, the attachment of the panel to the sliding roof panel may result in damage to the sliding member. It would therefore be desirable to provide a separate, portable auxiliary fan unit that will not damage the car, require any changes to the car, or generate drag on the vehicle.

SUMMARY OF THE INVENTION

The present invention is a portable auxiliary fan unit that can be installed into the sunroof of an automobile and exhausts the air from the passenger compartment of the vehicle. The fan unit includes a panel assembly which has a passage that provides fluid communication between the passenger compartment and the outside of the car. Within the passage is a fan which can induce air flow from the interior of the vehicle to the ambient. The fan is powered by a plurality of solar cells located beneath a transparent top panel member.

The fan unit is installed into an opening of the roof that is created by fully retracting the sliding roof panel of the car. The unit has a pair of levers at opposite edges of the transparent panel. The levers rest on the tracks that normally guide the sliding roof panel, to secure the panel and fan to the roof of the car. Once installed, the solar cells power the fan, which causes air to flow from the passenger compartment to the outside of the car. The fan unit does not come into contact with the top of the roof or the sliding roof panel. There is therefore a low probability of scratching the paint or otherwise damaging the car with the fan unit of the present invention.

The passage is formed by a scoop in the top panel member. The scoop is tapered from the front to the back of the panel assembly to minimize the drag effects of the unit on the vehicle. The fan unit is located below the roof line of the car, to lower the profile of the scoop and to improve the efficiency of the fan in removing air from the interior of the car.

Therefore it is an object of the present invention to provide a portable auxiliary fan unit that can be installed into the sunroof of a car without changes to the car.

It is also an object of the present invention to provide a portable auxiliary fan unit that does not generate drag on the car.

It is also an object of the present invention to provide a portable auxiliary fan unit that will have a low probability of damaging the car when installed.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 3 is a cross-sectional view of the fan unit taken at line 3—3 of FIG. 2;

FIG. 5 is an enlarged sectional view of the fan unit showing a rotating locking mechanism;

FIG. 6 is a cross-sectional view taken at line 6—6 of FIG. 5;

DETAILED DESCRIPTION OF THE INVENTION

Figure 1:
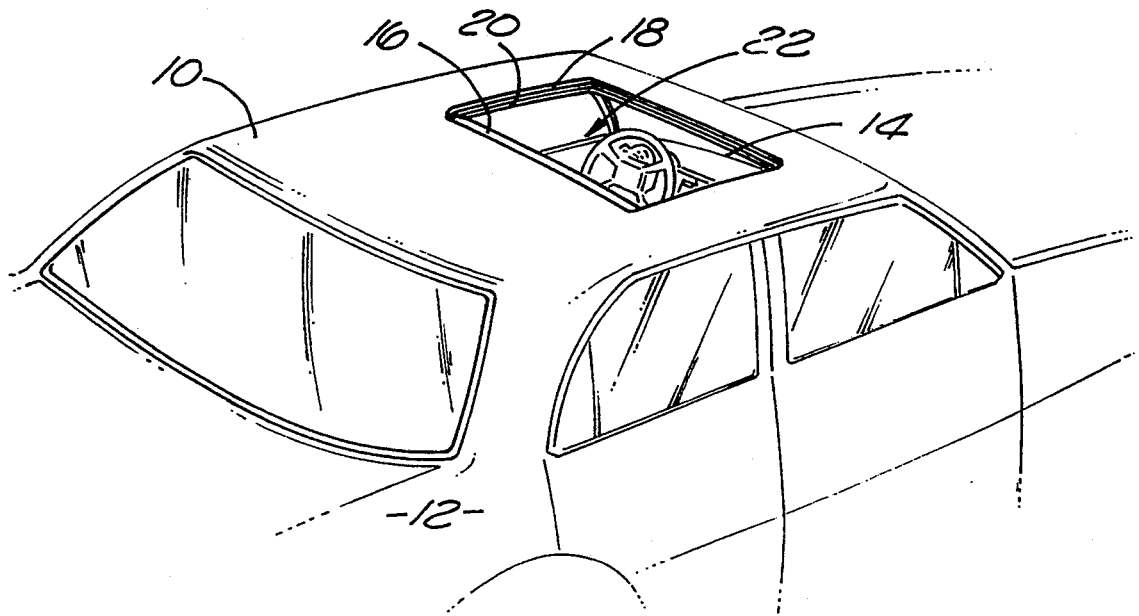
FIG. 1 is a perspective view of a motor vehicle with a sunroof.

Referring to the drawings more particularly by reference numbers, FIG. 1 shows the roof 10 of a motor vehicle 12. The roof 10 has an opening 14 which is created by the retraction or removal of a roof panel 16. The motor vehicle 12 typically has a pair of channels 18 on each side of the opening 14. The channels 18 are formed by the top of the roof and a pair of tracking rails 20 that guide the roof panel 16. The opening 14 exposes the passenger compartment 22 of the vehicle 12.

Figure 2:
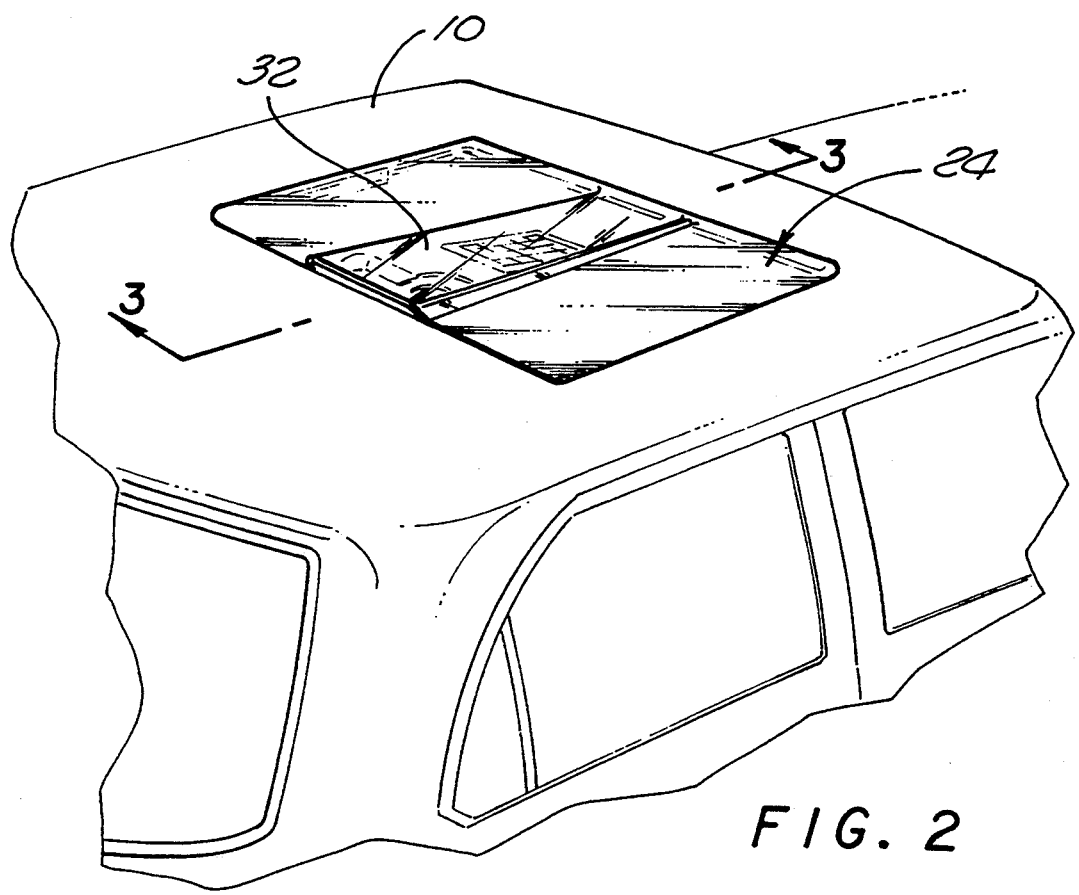
FIG. 2 is a perspective view showing a fan unit of the present invention installed into the roof of a car.

FIG. 2 shows a portable auxiliary fan unit 24 of the present invention installed into the roof 10 of the vehicle 12. As shown in FIGS. 3–8, the fan unit 24 has a top panel 26. The panel 26 is preferably molded as a single piece of transparent acrylic, although it is to be understood that other materials and methods of construction may be employed. The panel 26 encloses a fan subassembly 30. The top panel 26 has a tapered scoop portion 32 that defines a passage 34. Within the passage 34 is a fan 38 that is mounted to a frame 40 of the fan subassembly 30. The frame 40 is typically constructed from a molded plastic that is both light and strong.

The fan 38 is driven by an electric motor that is coupled to a panel of photo voltaic cells 42. The solar panel 42 is typically supported by the frame 40. Alternately. the cells 42 may be mounted directly to the top panel 26. The solar cells 42 are located beneath the transparent top panel 26, so that the cells 42 are directly exposed to the sunlight. The solar cells 42 are preferably connected in series to increase the voltage supplied to the fan 38. The fan subassembly 30 may include a battery (not shown) that stores the power generated by the photo cells 42. The fan 38 may have either a DC or AC motor. It being understood that the fan subassembly 30 would include circuitry to convert the DC power of the cells 42 to an alternating current if an AC motor is used. The fan subassembly 30 may also include a switch to turn the fan 38 on and off. The fan 38 is constructed to induce air flow through the passage 34 in the direction indicated by the arrows in FIG. 3.

A grill 44 may be attached to the fan 38 to prevent injury by the fan impeller. The gill 44 may be molded into the frame 30 or attached as a separate component. Although a completely transparent panel 26 has been described, it is to be understood that the top panel 26 may be opaque or tinted except for the area adjacent to the solar cells 42.

Figure 4:
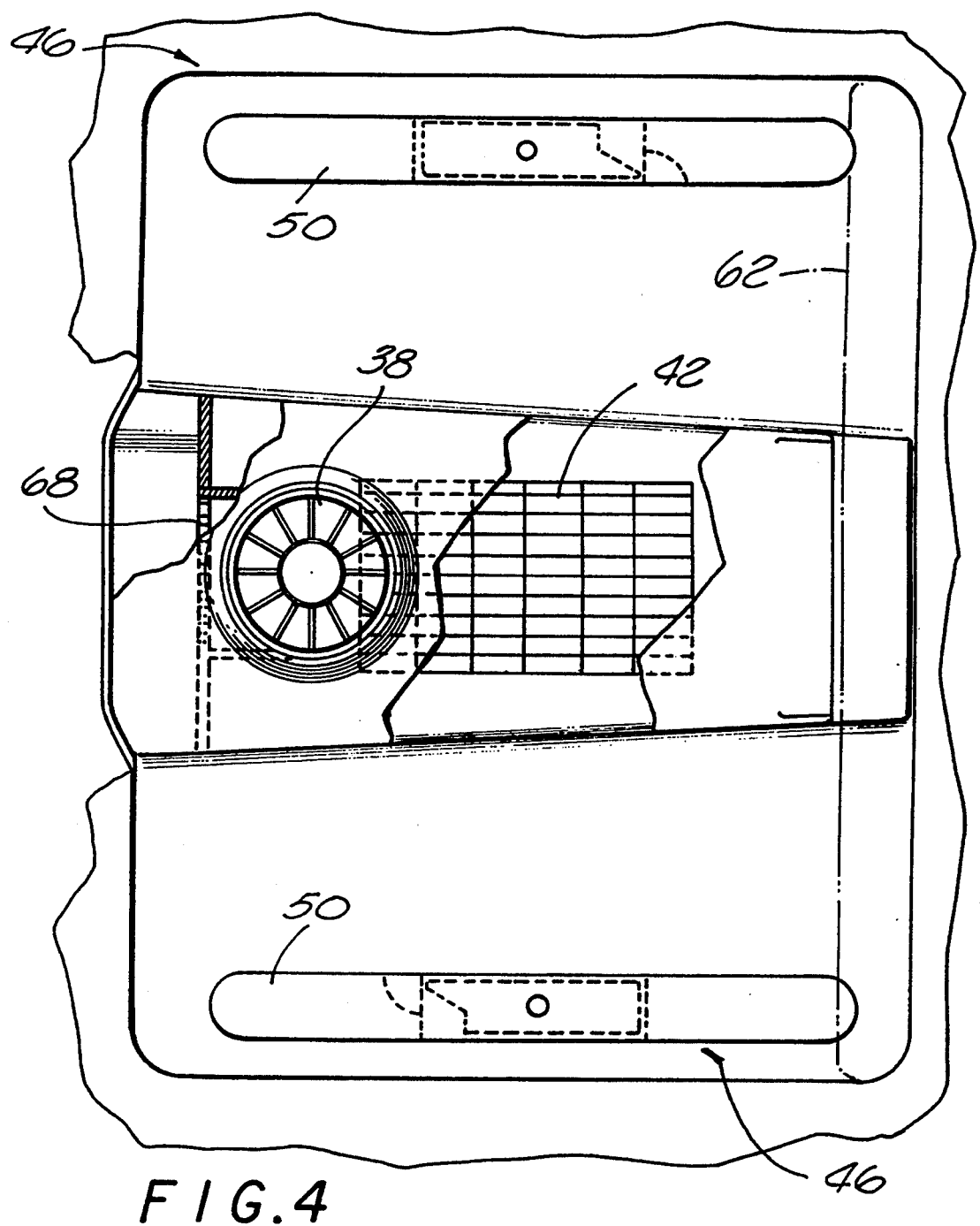
FIG. 4 is a bottom view of the fan unit taken at line 4—4 of FIG. 3.
Figure 7:
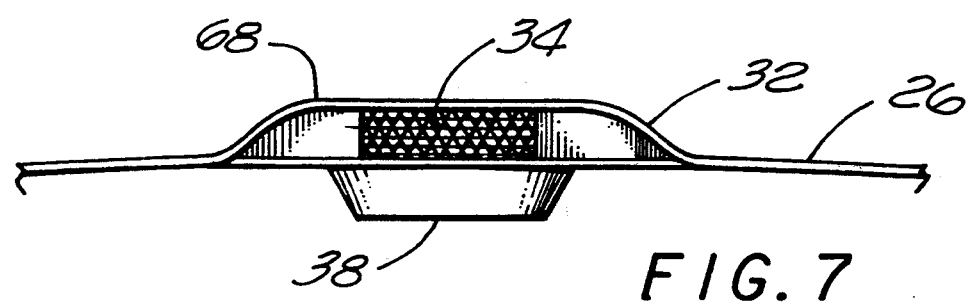
FIG. 7 is a sectional rear view of the fan unit.
Figure 8:
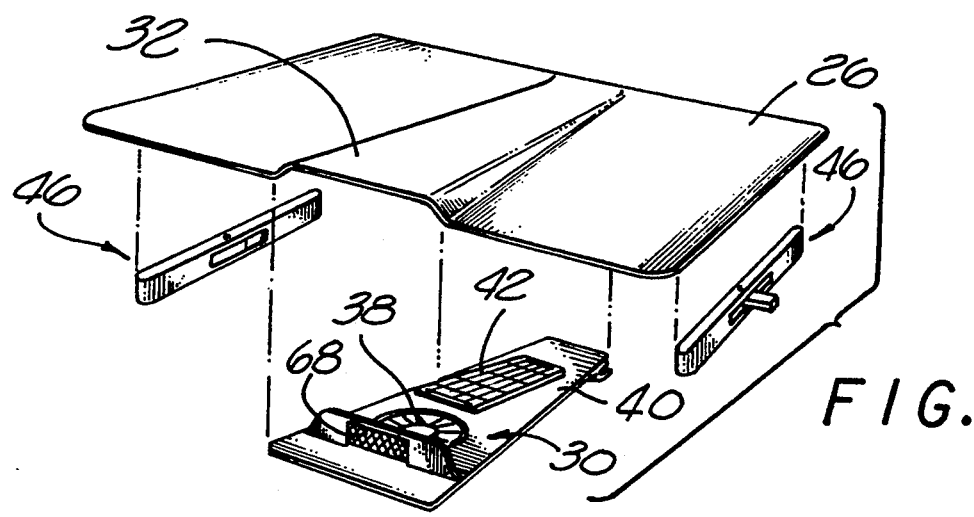
FIG. 8 is an exploded view of the fan unit.

As shown in FIGS. 4–6, the fan unit 24 has a pair of guide subassemblies 46 that fasten the panels to the roof of the vehicle. Each subassembly 46 has a handle lock lever 48 pivotally connected to a support bar 50 by a pin 52. The support bars 50 have grooves 51 that allow the levers 48 to rotate between a retracted position and an extended position. The levers 48 have handle portions 54 that allow the user to grab the levers and rotate the same.

The support bars 50 are attached to the edges of the top panel 26 at locations which allow the levers 48 to enter the channels 18 of the roof 10. Although straight handle portions are described and shown, it is to be understood that other handle configurations can be employed. For example, the handle portions 54 may have a C shaped bar extending from the lever 48, with an opening to allow the fingers to extend there through.

The fan unit 24 is installed into the roof 10 by placing the panel 26 into the opening 14 and inserting the levers 48 into the channels 18. The unit 24 is preferably installed by first placing it in the opening 14 so that the support bars 50 rest on the guide rails 20. The levers 48 are then rotated 90°, so that the end of the levers are inserted into the channels 18. The unit 24 is supported by the guide rails 20 and secured to the roof by the levers 48. The unit 24 does not engage the roof panel 16 or the top surface of the roof.

Many car models have an air deflector 62 that moves into an upright position when the roof panel 16 is retracted, and back into a linear position when the roof panel 16 is closed. The fan unit 24 may have a front groove 64 that can receive the air deflector 62 to further secure the panel 26 to the roof 10. For vehicles with air deflectors 62, it is preferable to first insert the unit 24 into the rear of the opening 14 and then slide the panel 26 toward the front of the roof 10, so that the deflector 62 moves down and into the groove 64.

When the fan unit 24 is installed, the exhaust opening 66 of the passage 34 is located above the roof 10 so that the air is readily exhausted into the ambient. The top panel 26 is preferably constructed so that the exhaust opening 66 is at an angle oblique to the roof 10. The oblique angle prevents rain and other foreign debris from falling into the passage 34 and acts as a handle recess when installing and moving the unit. The oblique angle also improves the flow of air out of the passage 34. The fan unit 24 may also have a water barrier 68 that prevents water from flowing down into the passenger compartment 22. The water barrier 68 may be constructed as a grill with shades that extend across the passage 34. The barrier 68 preferably has a bottom stop 70 that prevents pooling water from running down the passage into the car. The fan unit 24 may also have a seal (not shown) around the entire outer edge of the top panel 26 to seal the panel 26 to the roof 10.

When installed in daylight, the solar cells 42 power the fan 38 which draws air out of the passenger compartment 22. The air is exhausted into the ambient through the passage 34. Because hot air rises and the fan is located in the roof, the unit is quite efficient in removing hot air from the passenger compartment. It is preferable to leave the vent of the motor vehicle open to increase the flow of air entering the passenger compartment 22. The scoop 32 of the top panel 26 is preferably constructed so that the fan unit 24 does not introduce any excessive drag on the vehicle 12. The profile of the fan subassembly 30 is low enough to provide head clearance for the occupants of the car. The fan typically does not extend past the inner ceiling of the roof, so that the unit does not occupy head space in the passenger compartment.

Figure 9:
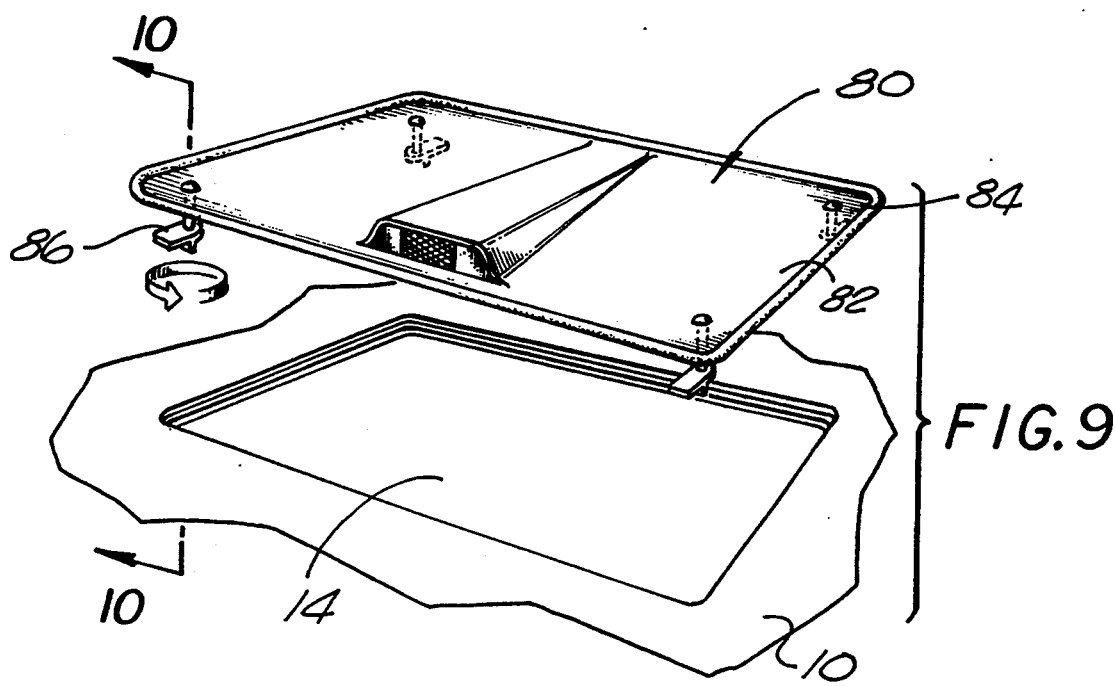
FIG. 9 is a perspective view of an alternate fan unit.
Figure 10:
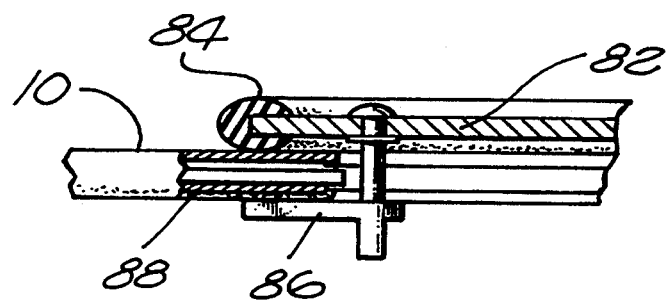
FIG. 10 is a cross-sectional view showing the fan unit of FIG. 9 attached to the roof of a car.

FIGS. 9 and 10 show another embodiment of the vent assembly 80. This embodiment includes a single panel assembly 82 which is larger than the opening 14 of the roof 10. The panel 82 is placed on the top of the roof 82 to cover the opening 14. The edges of the panel have a gasket 84 which seals the panel 82 without damaging the roof 10 of the car. The gasket 84 is preferably constructed from a silicone rubber which is soft, compressible and is impervious to most hostile environments.

The vent assembly 80 has four cams 86 located at the corners of the panel 82. The cams 86 are mounted to the panel 82 so that the cams 86 can rotate between locked and unlocked positions. When the vent 80 is initially installed the cams are in the unlocked positions. After the panel 82 is placed onto the roof 10, the cams 84 are rotated so that the cams 84 engage the ceiling 88 of the car. Rotation of the cams 84 into the locked position also compresses the gasket 84 and seals the fan unit 80 onto the roof 10.

The fan unit 80 has a fan (not shown) that induces air flow through a passage formed in the panel 82. The fan is powered by solar cells as described above. The fan unit 80 may also have handles to assist in the installation and removal of the panel 82.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A portable auxiliary fan unit for a motor vehicle that has a roof with an opening which exposes a passenger compartment of the motor vehicle to the ambient, the motor vehicle further having a pair of channels adjacent to a pair of guide rails in the roof, comprising:
- a top panel adapted to be placed into the opening of the roof, said top panel having a tapered scoop portion;
- a bottom panel attached to said top panel;
- a fan frame enclosed by said top and bottom panels, said fan frame and tapered scoop portion defining a passage that provides fluid communication between the passenger compartment and the ambient;
- a fan mounted to said fan frame and in fluid communication with said passage;
- at least one photo voltaic cell adjacent to said top panel and coupled to said fan; and,
- a pair of support bars attached to said top panel and which support said top panel on the guide rails of the roof;
- a pair of levers pivotally connected to said support bars and adapted to move between a retracted position and an extended position into the channels of the roof, said levers being aligned with the channels by said support bars.

2. The fan unit as recited in claim 1, further comprising a water barrier means for preventing rain and other foreign material from entering the passenger compartment through said passage.

3. A method of installing a portable auxiliary fan unit into a motor vehicle that has a roof with an opening which exposes a passenger compartment of the motor vehicle to the ambient, the motor vehicle further having a pair of channels adjacent to a pair of guide rails in the roof, comprising the steps of:
a) providing a portable auxiliary fan unit that includes;
- a panel assembly adapted to be placed into the opening of the roof, said panel assembly having a passage that allows fluid communication between the passenger compartment and the ambient;
- a fan operatively connected to said panel assembly and in fluid communication with said passage;
- a pair of support bars attached to said panel assembly;
- at least one photo voltaic cell coupled to said fan;
- a pair of levers pivotally connected to said support bars and adapted to move between a retracted position and an extended position, said levers being aligned with the channels by said support bars;
b) moving said fan unit until said support bars rest on the guide rails; and,
c) rotating said levers into said extended positions so that said levers are inserted into the channels.

* * * * *